United States Patent
Orellana et al.

(10) Patent No.: US 9,878,665 B2
(45) Date of Patent: Jan. 30, 2018

(54) ACTIVE DETECTION AND ENHANCED VISUALIZATION OF UPCOMING VEHICLES

(71) Applicant: Ford Global Technologies, LLC, Dearborn, MI (US)

(72) Inventors: Fernando Mar Orellana, Mexico (MX); Oscar Anaya, Tlalnepantla (MX); Jose Ramon Molina, Tlalnepantla (MX)

(73) Assignee: Ford Global Technologies, LLC, Dearborn, MI (US)

(*) Notice: Subject to any disclaimer, the term of this patent is extended or adjusted under 35 U.S.C. 154(b) by 290 days.

(21) Appl. No.: 14/865,231

(22) Filed: Sep. 25, 2015

(65) Prior Publication Data

US 2017/0088053 A1    Mar. 30, 2017

(51) Int. Cl.
*B60R 1/12* (2006.01)
*B60Q 9/00* (2006.01)
(Continued)

(52) U.S. Cl.
CPC ............... *B60Q 9/008* (2013.01); *B60R 1/00* (2013.01); *B60R 1/08* (2013.01); *B60R 1/12* (2013.01); *B60R 2001/1215* (2013.01); *B60R 2001/1253* (2013.01); *B60R 2300/8026* (2013.01); *B60R 2300/8046* (2013.01); *B60R 2300/8066* (2013.01)

(58) Field of Classification Search
CPC .. B60Q 9/008; B60R 1/12; B60R 1/00; B60R 1/08
See application file for complete search history.

(56) References Cited

U.S. PATENT DOCUMENTS 6,198,409 B1  3/2001  Schofield et al.
6,636,258 B2  10/2003 Strumolo
(Continued)

FOREIGN PATENT DOCUMENTS

DE  102013005404 A1  9/2013
EP  1470957 A2  10/2004
(Continued)

OTHER PUBLICATIONS

Great Britain Search Report for Great Britain Application No. GB1616182.0 dated Mar. 29, 2017.

*Primary Examiner* — Nam Pham
(74) *Attorney, Agent, or Firm* — Frank MacKenzie; Brooks Kushman P.C.

(57) ABSTRACT

A vehicle is provided with multiple object-detecting devices, such as cameras and radar devices, that are configured to detect approaching vehicles from the rear. The object-detecting devices sense the relative distance and speed of the approaching vehicles relative to the vehicle. Based on the relative distance and speed, at least one controller is programmed to determine an anticipated collision time, indicating how long it would take for the upcoming vehicles to potentially collide with the vehicle. The controller can be programmed to illuminate a colored display on a rear-view mirror at a location where an approaching vehicle appears on the mirror, and change a color of the colored display based on the relative distance and relative speed of the approaching vehicle.

20 Claims, 5 Drawing Sheets

(51) Int. Cl.
  *B60R 1/08* (2006.01)
  *B60R 1/00* (2006.01)

(56) References Cited

U.S. PATENT DOCUMENTS

| | | |
|---|---|---|
| 7,755,508 B2 | 7/2010 | Watanabe et al. |
| 8,781,731 B2 | 7/2014 | Lo et al. |
| 8,989,916 B2 | 3/2015 | Tippelhofer et al. |
| 9,487,139 B1 * | 11/2016 | Ishida .................... B60Q 9/008 |
| 2011/0128142 A1 * | 6/2011 | Byun .................... B60Q 1/2665 |
| | | 340/475 |
| 2013/0201335 A1 | 8/2013 | Heinemann |
| 2015/0246640 A1 | 9/2015 | Lynam |

FOREIGN PATENT DOCUMENTS

| | | |
|---|---|---|
| FR | 2942064 A1 | 8/2010 |
| JP | 2007334566 A | 12/2007 |
| WO | 2011028686 A1 | 3/2011 |

* cited by examiner

ACTIVE DETECTION AND ENHANCED VISUALIZATION OF UPCOMING VEHICLES

TECHNICAL FIELD

The present disclosure relates to a vehicle equipped with a computerized system programmed to detect approaching vehicles and provide an illuminated display to increase awareness of the approaching vehicles to the driver.

BACKGROUND

Rear-view and side-view mirrors on a vehicle provide the driver of the vehicle with a direct visual of vehicles approaching from the rear. However, especially when the driver has little time to look at other vehicles in the mirror, it can be difficult to visually determine how far away a vehicle is, or how fast it is approaching. This can impact the driver's ability to determine whether it is safe to change lanes.

Many current vehicles are equipped with active blind-spot avoidance systems. These systems typically include sensors configured to detect an object in the vehicle's blind spot that may be difficult for a driver to see. When an object is in the blind spot, a light on the side-view mirror is illuminated.

SUMMARY

According to one embodiment, a vehicle comprises a rear-view mirror, a plurality of sensors, and a controller. The sensors are configured to detect a relative distance and speed of a second vehicle behind the vehicle. The controller is programmed to illuminate a colored display on the mirror at a location where the second vehicle appears on the mirror, and change a color of the colored display based on the relative distance and relative speed.

The controller can be programmed to (1) change the color to red in response to the relative distance being less than a first distance threshold and the relative speed exceeding a first speed threshold, (2) change the color to green in response to the relative distance exceeding a second distance threshold or the relative speed being less than a second speed threshold, and (3) change the color to yellow in response to the relative distance being less than the first distance threshold and the relative speed being between the first and second speed thresholds.

In another embodiment, a method of enhancing driver-awareness in a vehicle is provided. The method includes detecting a relative distance and relative speed of a second vehicle approaching the vehicle, illuminating a colored display on a rear-view mirror at a location where the second vehicle appears on the mirror, and changing a color of the colored display based on the relative distance and relative speed.

In yet another embodiment, a vehicle includes a camera configured to record images of a scene rearward of the vehicle. A plurality of sensors are configured to determine a relative speed and distance of a second vehicle. A display is configured to display the images. A controller is programmed detect the second vehicle in the images, and illuminate the second vehicle on the display with a color that changes based on the relative speed and distance of the second vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
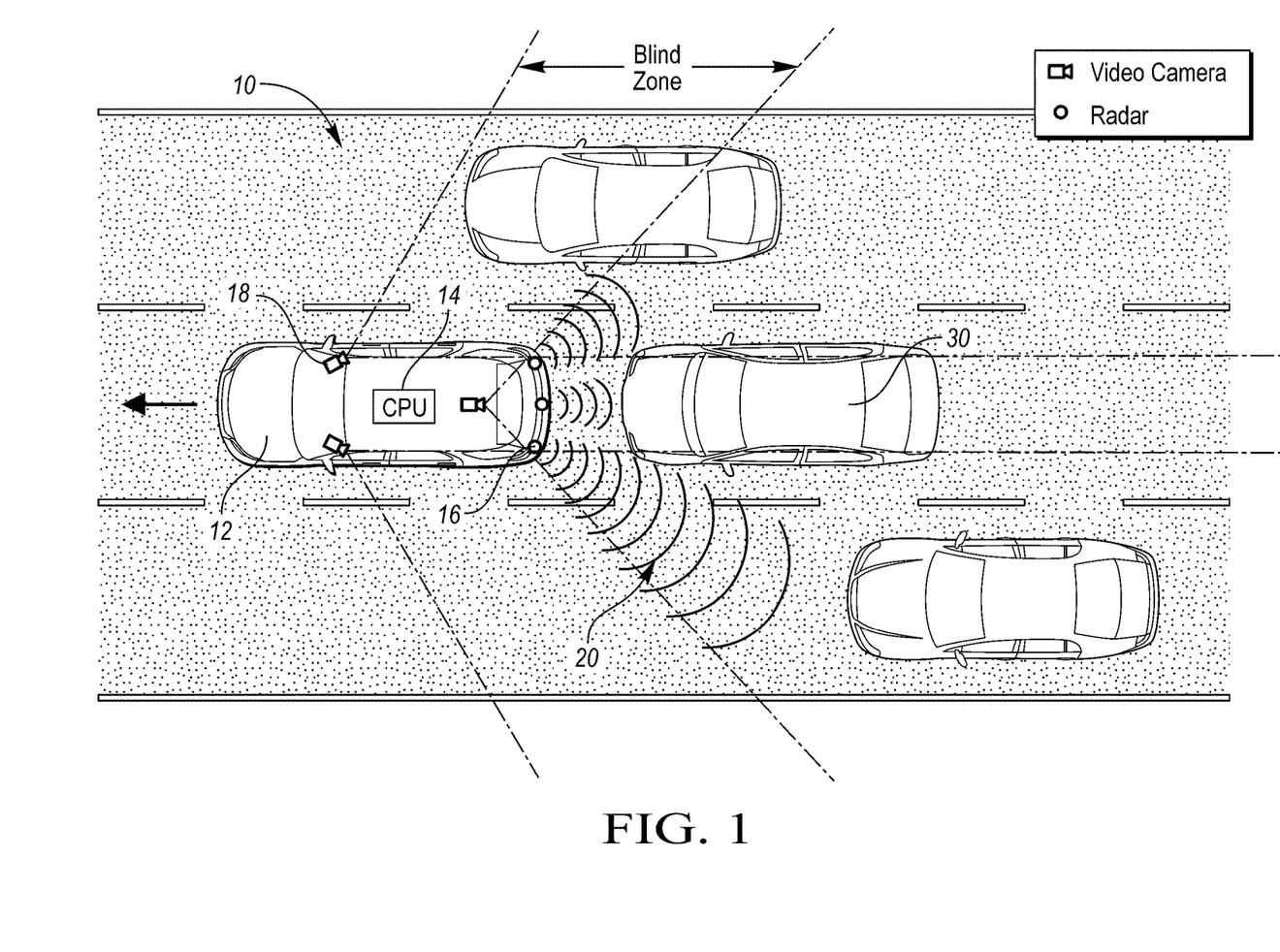
FIG. 1 is an overhead schematic view of a vehicle detection system, according to one embodiment.

Referring now to FIG. 1, an active vehicle detection and control system 10 for a host vehicle 12 has at least one controller 14. The at least one controller 14 can be one or more microprocessors, computers, or other microprocessor-based controller that is coupled to a memory and specifically programmed to carry out and execute the methods and actions described below. In the interest of brevity, these hardware platforms will be referred to simply as a "controller" 14.

A plurality of object-detecting devices is connected to the controller 14. These object-detecting devices are represented in FIG. 1 as a plurality of radar devices 16 and video cameras 18 mounted to the vehicle 12. The radar devices can be mounted to the rear bumper of the vehicle 12, for example, as part of a parking assist system. The radar devices 16 generate an object signal in response to the presence of an object within its field of view 20. The video cameras 18 may be mounted to the top of the vehicle or on the rear bumper, for example, and can include one or more cameras, CCD, or CMOS type devices. Multiple video cameras may form a vision system to cooperate with the radar devices. The radar devices 16 are capable of sensing the presence and the distance of an object (such as another vehicle 30) from the host vehicle 12. When used as a stereo pair, the cameras act together such that they are capable of detecting the distance of an object from the vehicle. Alternatively, radar may be used to detect an object within a field of view and the vision system may be configured to confirm the presence of the object within the field of view and to provide a classification and size of the object to controller 14. In another embodiment, multiple cameras 18 alone may use established triangulation techniques to determine the presence of an object and its distance from the vehicle, determine classification characteristics of the object as well as the object's size that may include area, height or width, or combinations thereof.

The actual location and positioning of the object-detecting devices 16, 18 can vary and are not intended to be limited. And, the number of object-detecting devices 16, 18 provided throughout the vehicle can vary according to the specific configuration of the vehicle. The object-detecting devices 16, 18 can be arranged to detect vehicles approaching from the rear, as well as vehicles that may be in the blind zone that may be difficult for the driver to see by looking at mirrors.

It should be understood that the object-detecting devices are not limited to only radar devices and cameras. For example, lidar, sonar, and other such devices can be used according to the knowledge of one skilled in the art. These object-detecting devices, when used in combination with the software executed by the controller 14, can detect the size of other vehicles 30 as well as the distance of other vehicles 30 from the host vehicle.

A timer or time source is also coupled to the controller 14. The relative distance between the vehicle 12 and any approaching vehicles 30 can then be compared to time so that the controller 14 can calculate a closing speed or approaching speed of the approaching vehicles 30. For example, the radar devices 16 may detect an approaching vehicle 30 having a distance of 40 meters from the vehicle 12. The distance is continuously pinged. After one second, the distance of the approaching vehicle 30 may be detected as being 30 meters. The controller 14 therefore calculates a closing speed of 10 m/s. Based on the closing speed, the controller 14 can determine an anticipated impact time, by comparing the closing speed to the remaining distance of the approaching vehicle 30.

A speed sensor (not shown) is also coupled to controller 14. The speed sensor determines the speed of the vehicle 12 from data representing the speed of the wheels of the vehicle. For example, a suitable speed sensor may include a sensor at every wheel that is averaged by controller 14; the controller 14 then translates the wheel speeds into the speed of the vehicle. Suitable type of speed sensors may include, for example, toothed wheel sensors such as those employed on anti-lock brake systems.

By using data from the speed sensor, the controller 14 can approximate the actual speed of the approaching vehicle 30. To do so, the controller 14 compares the relative closing distance of the approaching vehicle 30 to the actual speed of the host vehicle 12. The computed actual speed of the approaching vehicle can be prompted or otherwise visually provided to the driver of the vehicle according to the methods outlined below.

Changing lanes while driving is often a dangerous but necessary maneuver. A rear-view mirror and side-view mirrors are provided on the vehicle to improve the driver's awareness when attempting a lane change. However, it is often difficult to, at a quick glance, determine how fast other vehicles are approaching. And, the driver is putting himself (and other occupants) at risk if the driver keeps his eyes off the road for too long of a time while attempting to visually determine how fast the approaching vehicle is traveling and whether or not it is safe to change lanes.

Various embodiments of the present disclosure include an active vehicle-detecting system for detecting upcoming vehicles and a corresponding visual prompt providing data to the driver to increase awareness, helping the driver determine whether a lane change is safe. According to the embodiments described below, the object-detecting devices determine the location and speed of approaching vehicles relative to the driver's vehicle. This information is visually provided to the driver by illuminating specific areas on the rear-view mirror or side-view mirrors with colors (e.g., red, yellow, and green) to instantly provide the driver with improved awareness of the surroundings. This can help aid the driver in determining whether a lane change would be safe.

Figure 2:
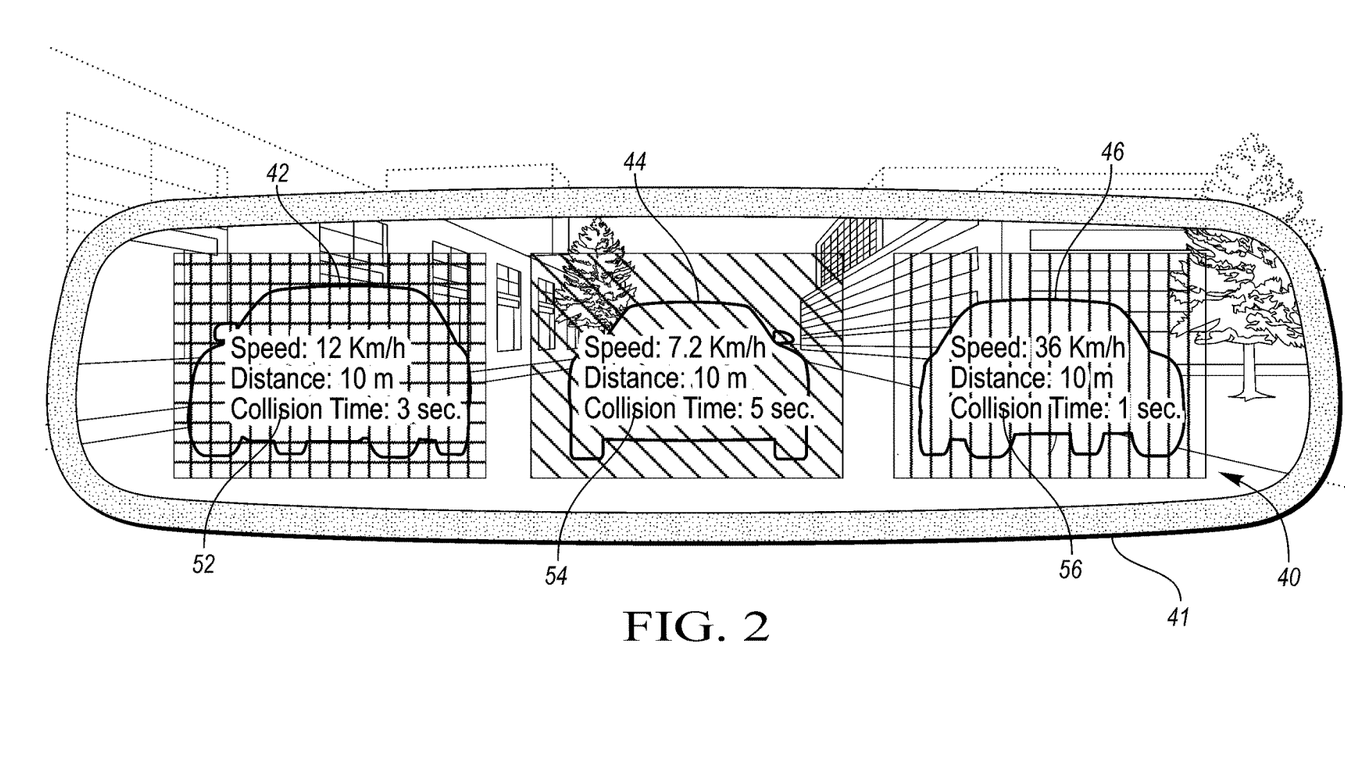
FIG. 2 is a view of the environment behind the vehicle when looking at a rear-view mirror, with colored shading provided over vehicles appearing in the rear-view mirror, according to one embodiment.

Referring to FIG. 2, the view 40 of the environment as looking through a rear-view mirror 41 is shown. Three different vehicles 42, 44, 46 are shown in the mirror, indicating to the driver that three vehicles are behind and potentially approaching the driver's vehicle. Accompanying data 52, 54, 56 is provided that provides information for each respective vehicle 42, 44, 46. This data can include the speed of the respective vehicle, the distance the vehicle is from the driver's vehicle, as well as the anticipated collision time. This data can also be provided visually to the driver via LEDs or other light sources in the mirror. As provided above, the anticipated collision time can be determined based on the determined closing speed of the approaching vehicle and its distance from the driver's vehicle.

The rear-view mirror includes a housing with a light source (such as LEDs, etc.) therein. The light source is coupled to the controller 14. Based on the distance the other vehicles are from the host vehicle, and based on the closing speed or actual speed of the other vehicles, the controller is programmed to illuminate a colored display on the mirror. The colored display can appear at a location where the other vehicles appear in the mirror, or alternatively, in one fixed location. The illuminated color display can be red, yellow, or green based on the determined closing speed of the approaching vehicle and its distance from the driver's vehicle (e.g., the anticipated collision time).

If the anticipated collision time is less than a first predetermined time threshold (e.g., 2 seconds), the colored display is red, indicating that a lane change is not advised. If the anticipated collision time exceeds this first predetermined time threshold but is less than a second predetermined time threshold (e.g., 4 seconds), the colored display is yellow, indicating the potential for danger if the driver changes lanes. If the anticipated collision time exceeds the second predetermined time, the colored display is green, indicating it is safe to perform a lane change. Of course, these colors are not intended to be limited, and neither are the first and second time thresholds. These thresholds can be predetermined and set to any time value that would separate what would be considered a "safe" or "unsafe" lane change.

Various embodiments are contemplated as to how the controller determines where to illuminate the colored display. In one embodiment, the rear-view mirror is actually a video display that displays video feed from a video camera placed near the rear windshield of the vehicle, which is configured to record the scene behind the vehicle. The controller then displays the recorded scene on a screen located in the cabin where a conventional rear-view mirror is typically mounted. The system for displaying the scene on the screen is provided with shape-detecting software to recognize the appearance of a vehicle appearing on the display. The controller then corresponds the vehicle shown on the screen to the data provided by the object-detecting devices to correlate which vehicle 42, 44, 46 in the video feed is traveling with which set of data parameters 52, 54, 56. Based on the determined location of the vehicles on the screen, the controller can highlight, shade, or otherwise color that vehicles red, yellow, or green based on the relative distance and relative speed of the vehicles.

In another embodiment, the rear-view mirror is a conventional mirror, but its housing also includes LEDs or other light sources behind the mirror to illuminate locations of the vehicles appearing in the mirror. To do so, the rear-view mirror may be equipped with its own camera within the housing and the controller may include facial recognition software to determine the location of the drivers face and/or eyes. Based on that location, the controller can infer where the vehicles would appear in the mirror to the driver. As the driver moves his head, the location of the vehicles 42, 44, 46 in the mirror also changes, and the camera in the mirror with the associated controller can move the location of the illuminated colored display accordingly.

In yet another embodiment, one of the cameras is also part of a lane-detecting system such that the camera and the controller can determine lanes of travel. The field of view may be at least three lanes, including the lane the vehicle is traveling in, and the immediate left and immediate right lanes. The relative speed and distance of a car in that lane will cause a corresponding LED in the rear-view mirror in either a left, central, or right region of the mirror to align with what that lane as the driver would see it from the rear-view mirror.

The actual colored display provided on the rear-view mirror can come in various forms. In non-limiting examples, the vehicles appearing in the mirror can be provided with a (1) a colored box around that vehicle, (2) a colored line underneath, above, or to the side of that vehicle, or (3) a halo about that vehicle. In other embodiments, the controller is simply configured to activate either a red, yellow, or green light in the mirror at a consistent, predetermined location regardless of the location of the vehicles appearing in the mirror. In that embodiment, the driver can quickly glance to see the color of any illumination to determine if a lane change is safe, without looking for individual vehicles in the mirror.

The controller 14 can be configured to not provide a colored display around approaching vehicles appearing in the mirror if the approaching vehicles are determined to be a distance beyond a predetermined threshold from the host vehicle. For example, if the sensors or cameras detect a vehicle that is 100 meters away from the host vehicle, the controller may not provide a corresponding colored display because the vehicle is beyond a predetermined distance threshold of 80 meters. This predetermined distance threshold can be set according to the specifics of the vehicle, and is not intended to be limited. Also, the predetermined distance threshold can vary as the speed of the host vehicle varies. For example, the predetermined distance threshold can increase in distance to provide more vehicles with the colored display when the host vehicle is traveling at increased speeds.

Along with the predetermined distance threshold, the controller can also be programmed with a predetermined anticipated collision time threshold for displaying the colored display. In one example, any detected approaching vehicle with an anticipated collision time of greater than 10 seconds will not cause the controller to activate a colored display for that vehicle.

Figure 3A:
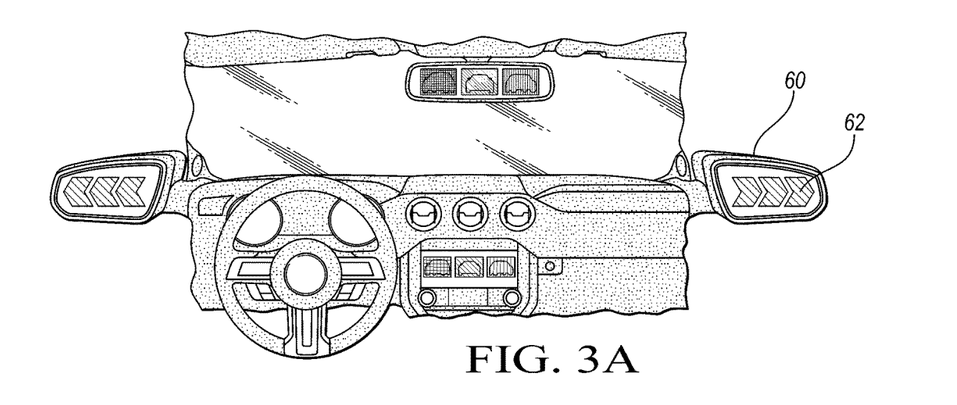
FIGS. 3A-3C are multiple perspective views of the vehicle cabin and side-view mirrors, in which the side-view mirrors are provided with illuminated turn signals that illuminate in various colors based on approaching vehicles.
Figure 3B:
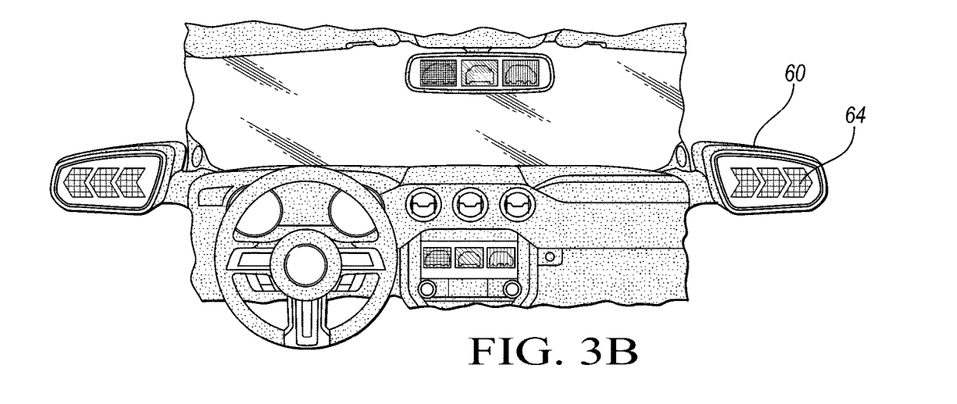
Figure 3C:
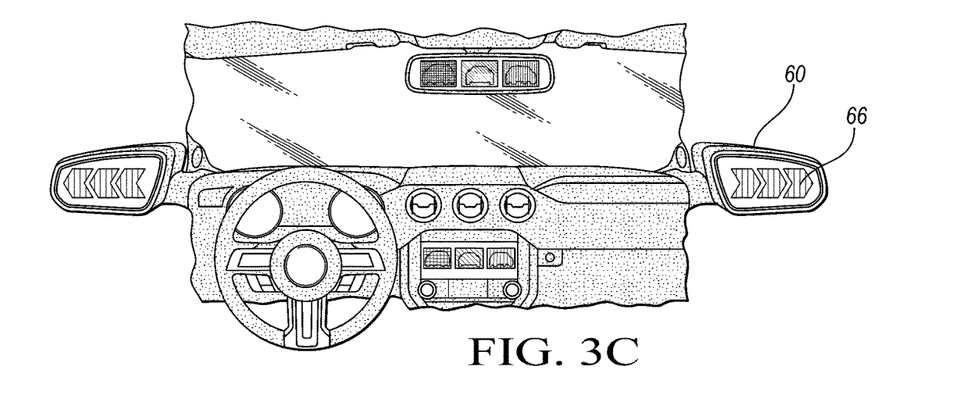

FIG. 3 illustrates additional safety precautions that can be commanded by the controller based on the relative distance and speed of approaching vehicles. Side-view mirrors 60 can include illuminated turn signal displays to alert external vehicles of the driver's intention to turn or change lanes. The present disclosure contemplates changing the color of these turn signal displays in response to the controls explained above. If any detected approaching vehicle causes the controller to activate a "red" colored display, indicating that it is not safe or advisable to change lanes due to the distance and relative speed of the approaching vehicle, the turn signal on the side-view mirror will also be illuminated in "red" as shown as 62 in FIG. 3A. In use, the turn signal will illuminate on the side-view mirror in response to the driver of the vehicle pulling the turn-signal lever within the vehicle cabin; the turn signal illuminated on the side-view mirror will have a color corresponding to the colors appearing in the rear-view mirror. If any one vehicle in the rear-view mirror is shaded red, the turn signal will correspondingly be illuminated red at 62. In the absence of any vehicles being shaded red in the rear-view mirror, the turn signal will be illuminated yellow (as shown as 64 in FIG. 3B) or, if no vehicles are shaded yellow, the turn signal will be illuminated green (as shown as 66 in FIG. 3C) indicating a lane change is safe.

Figure 4:
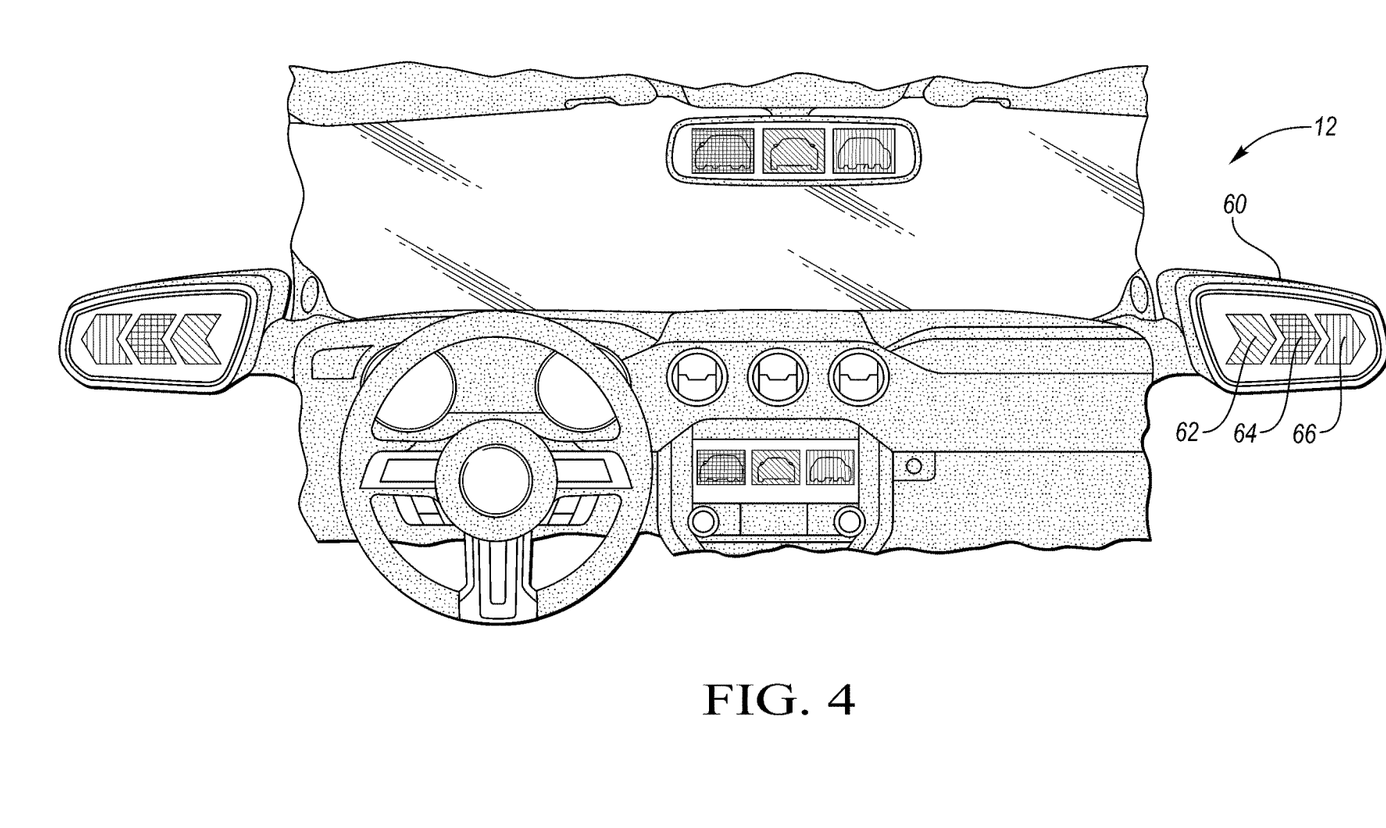
FIG. 4 is a perspective view of the vehicle cabin and side-view mirrors showing multiple locations of the colored display according to multiple embodiments of the present disclosure.

FIG. 4 shows a perspective view of the interior of the vehicle 12 as well as the side-view mirrors 60 while using the control system outlined in this disclosure. The vehicles in the rear-view mirror are shaded either red 62, yellow 64, or green 66. The turn signals on the side-view mirrors 60 are illuminated according to the description above.

The center console is also provided with an illuminated display, such as a multimedia display known in the art. The center console display can display a video feed from a rear-facing camera when, for example, the vehicle is in reverse. Any objects detected by the rear-facing camera or any corresponding radar devices can be shaded red, yellow or green in response to their anticipated collision time or relative distance and speed relative to the vehicle.

Figure 5:
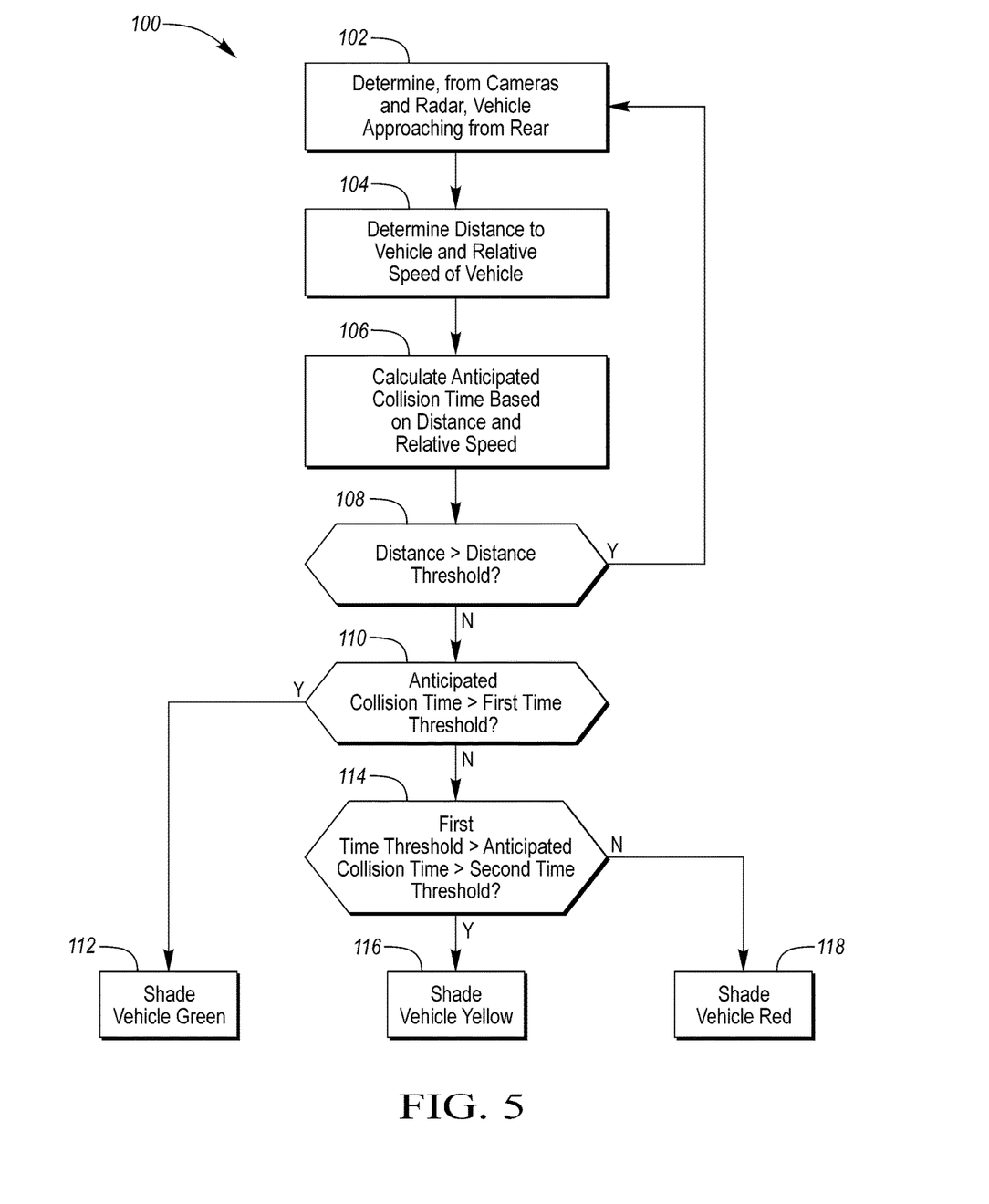
FIG. 5 is a flow chart illustrating an example of an algorithm implemented by at least one controller for detecting approaching vehicles and alerting the driver to improve overall awareness.

FIG. 5 illustrates a flow chart of an exemplary algorithm 100 implemented by the controller for improving the visual awareness of the driver of the vehicle according to the system described above. At 102, the controller receives signals from video cameras, radar devices, and/or other object-detecting devices explained above. These signals are processed by the processor to determine which objects or other vehicles are approaching from the rear.

At 104, the controller receives signals from the object-detecting devices regarding the distance away the approaching vehicles are, as well as the relative speed (e.g., closing speed) of the approaching vehicles. For each approaching vehicle, the controller is programmed to determine its distance from the host vehicle, its speed compared to the host vehicle, and optionally its actual speed according to the description provided above. The controller then processes this information to determine the approaching vehicles' respective anticipated collision time (i.e., the time it will take for the approaching vehicle to collide with the host vehicle) at 106. This information can be optionally displayed to the driver.

At 108, the controller compares the measured distance of the approaching vehicles to a predetermined distance threshold (discussed above). If the distance of that vehicle exceeds the predetermined distance threshold, the controller will not provide any illuminated or colored display on the mirror that corresponds to that vehicle; the controller will return to 102.

At 110, the controller compares the anticipated collision time to a first time threshold, according to the description provided above. This allows the controller to determine what color should be illuminated for the driver to see and interpret as being a safe or unsafe lane change. If the anticipated collision time exceeds the first time threshold at 110, then at 112 the approaching vehicle appearing in the rear-view mirror is provided with a green colored display.

If the anticipated collision time does not exceed the first time threshold but does exceed a second threshold that is less than the first time threshold at 114, then at 116 the approaching vehicle appearing in the rear-view mirror is provided with a yellow colored display.

If the anticipated collision time does not exceed either the first or second time threshold at 114, then at 118 the approaching vehicle appearing in the rear-view mirror is provided with a red colored display.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle comprising:
    a rear-view mirror;
    a plurality of sensors configured to detect a relative distance and speed of a second vehicle behind the vehicle; and
    a controller programmed to
        illuminate a colored display on the mirror at a moveable location that moves corresponding to where the second vehicle appears on the mirror, and
        change a color of the colored display based on the relative distance and relative speed.

2. The vehicle of claim 1, wherein the controller is programmed to change the color to red in response to the relative distance being less than a first distance threshold and the relative speed exceeding a first speed threshold.

3. The vehicle of claim 2, wherein the controller is programmed to change the color to green in response to the relative distance exceeding a second distance threshold or the relative speed being less than a second speed threshold.

4. The vehicle of claim 1, wherein the controller is programmed to display, on the rear-view mirror, an anticipated collision time that is based on the relative distance and relative speed of the second vehicle.

5. The vehicle of claim 4, wherein the controller is programmed to change the color of the colored display based on the anticipated collision time.

6. The vehicle of claim 1 further comprising a side-view mirror, wherein the controller is programmed to illuminate a second color display on the side-view mirror that changes color based on the relative distance and relative speed of the second vehicle.

7. The vehicle of claim 6, wherein the second color display is a turn signal that activates in response to movement of a lever within the vehicle.

8. A method of enhancing driver awareness in a vehicle, comprising:
    detecting a relative distance and relative speed of a second vehicle approaching the vehicle;
    illuminating a colored display on a rear-view mirror at a location where the second vehicle appears on the mirror;
    moving the colored display as the location moves; and
    changing a color of the colored display based on the relative distance and relative speed.

9. The method of claim 8, wherein the changing includes changing the color to red in response to the relative distance being less than a first distance threshold and the relative speed exceeding a first speed threshold.

10. The method of claim 9, wherein the changing includes changing the color to green in response to the relative distance exceeding a second distance threshold or the relative speed being less than a second speed threshold.

11. The method of claim 8 further comprising changing the color of the colored display according to an anticipated collision time that is based on the relative distance and relative speed of the second vehicle.

12. The method of claim 11 further comprising changing the color to red in response to the anticipated collision time being less than a first threshold, changing the color to yellow in response to the anticipated collision time exceeding the first threshold but not a second threshold, and changing the color to green in response to the anticipated collision time exceeding the second threshold.

13. The method of claim 11 further comprising displaying the anticipated collision time on the rear-view mirror.

14. The method of claim 8 further comprising illuminating a turn signal on a side-view mirror based on driver input, and changing color of the turn signal based on the relative distance and relative speed of the second vehicle.

15. A vehicle comprising:
    a camera configured to record images of a scene rearward of the vehicle;
    a plurality of sensors configured to determine a relative speed and distance of a second vehicle;
    a display configured to display the images; and a controller programmed detect the second vehicle in the images, and illuminate the second vehicle on the display with a color that changes based on the relative speed and distance of the second vehicle.

16. The vehicle of claim 15, wherein the controller is programmed to change the color to red in response to the relative distance being less than a first distance threshold and the relative speed exceeding a first speed threshold.

17. The vehicle of claim 16, wherein the controller is programmed to change the color to green in response to the relative distance exceeding a second distance threshold or the relative speed being less than a second speed threshold.

18. The vehicle of claim 15, wherein the controller is programmed to change the color according to an anticipated collision time that is based on the relative speed and distance.

19. The vehicle of claim 18, wherein the controller is programmed to display the anticipated collision time on the display.

20. The vehicle of claim 15, wherein the controller is programmed to illuminate the second vehicle with a translucent color that overlaps the second vehicle on the display.

* * * * *